United States Patent [19]
Pratt et al.

[11] 4,376,604
[45] Mar. 15, 1983

[54] BLIND FASTENER FOR COMPOSITE MATERIALS

[75] Inventors: John D. Pratt, Rancho Cucamonga; Cu S. Huynh, Buena Park, both of Calif.

[73] Assignee: Monogram Industries, Inc., Santa Monica, Calif.

[21] Appl. No.: 229,323

[22] Filed: Jan. 29, 1981

[51] Int. Cl.³ .............................................. F16B 13/04
[52] U.S. Cl. ...................................... 411/34; 411/44; 411/54; 411/70
[58] Field of Search .................. 411/34, 37, 38, 39, 411/43, 44, 54, 56, 69, 70, 55

[56] References Cited

U.S. PATENT DOCUMENTS

| | | | |
|---|---|---|---|
| 1,695,303 | 12/1928 | Tomkinson | 411/34 |
| 2,341,598 | 2/1944 | Crowley | 411/38 |
| 3,129,630 | 4/1964 | Wing et al. | 411/43 |
| 4,033,222 | 7/1977 | Wilson | 411/33 |
| 4,142,439 | 3/1979 | Landt | 411/34 |

FOREIGN PATENT DOCUMENTS

| | | | |
|---|---|---|---|
| 510011 | 2/1955 | Canada | 411/34 |
| 2442259 | 3/1976 | Fed. Rep. of Germany | 411/38 |
| 436238 | 10/1935 | United Kingdom | 411/54 |
| 625331 | 6/1949 | United Kingdom | 411/44 |

*Primary Examiner*—Thomas J. Holko
*Attorney, Agent, or Firm*—Poms, Smith, Lande & Rose

[57] ABSTRACT

A blind fastener particularly suited for mechanically joining composite structures such as graphite and fiber-/epoxy matrix with a minimum of blind side damage. A first sleeve of highly ductile material is disposed as a liner about the portion of the nut which passes through the composite materials. The first sleeve extends longer than the thickness of the materials. A second sleeve of measurably less ductility is disposed between the first sleeve and the head of the threaded corebolt. The two sleeves have abutting surfaces which are non-sliding whereby as the nut and corebolt are threadily engaged and the two sleeves are brought into compression, the less ductile sleeve flairs the more ductile sleeve about the nut to create a protected area about the blind side of the materials.

10 Claims, 18 Drawing Figures

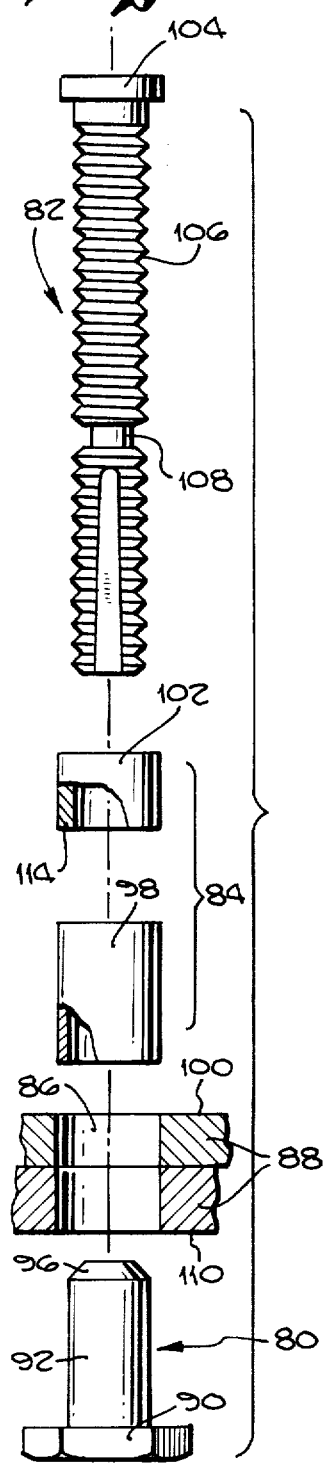
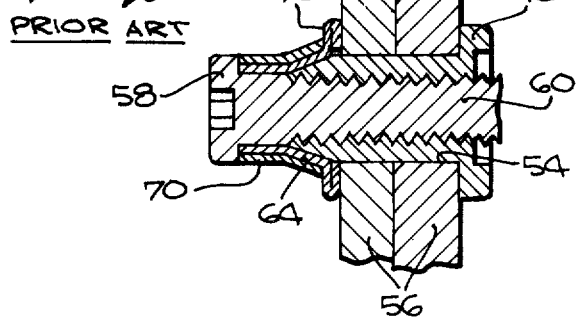
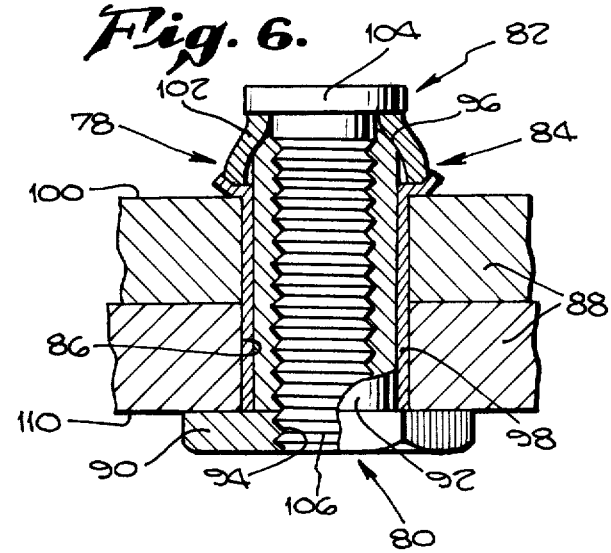
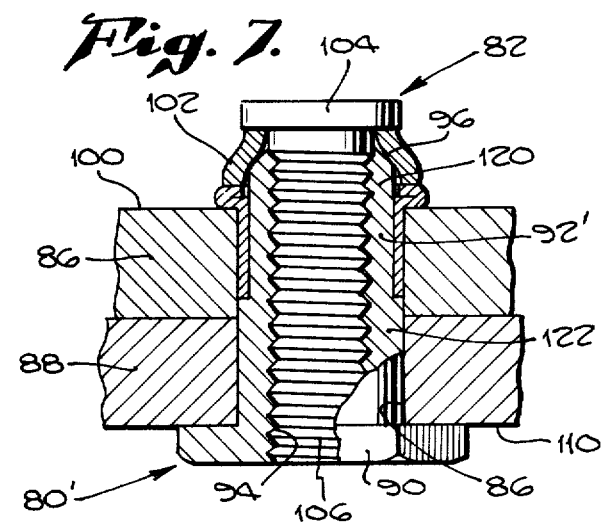

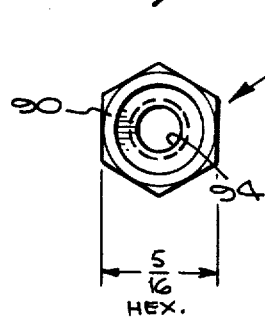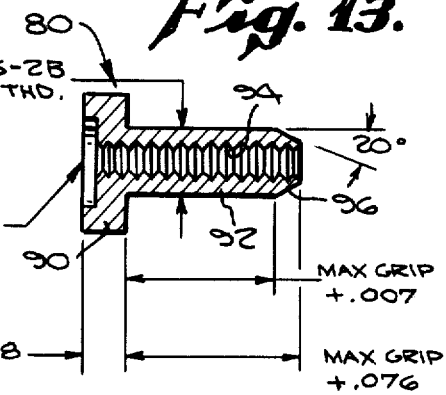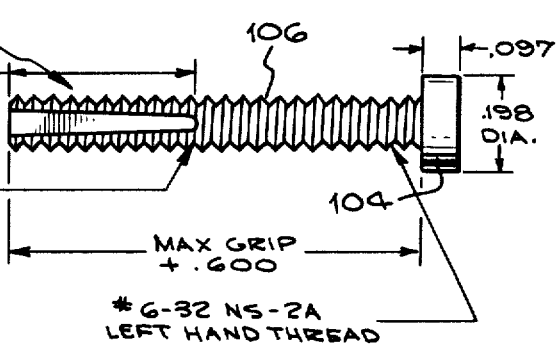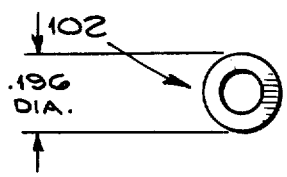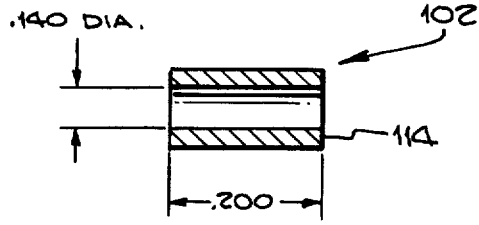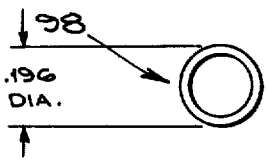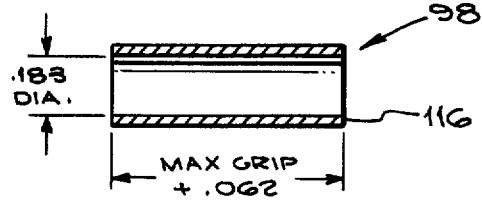

BLIND FASTENER FOR COMPOSITE MATERIALS

BACKGROUND OF THE INVENTION

The present invention relates to blind fasteners and, more particularly, to blind fasteners employed to join composite materials.

Blind fasteners of the general type shown herein are well known in the art. As used in joining materials such as aluminum used in more conventional aircraft, blind side damage had to be considered but was not of major concern.

More recently, constructions of aircraft and the like employing panels of composite materials such as graphite and fiber/epoxy matrix are more common. The problem of blind side damage and fasteners to provide strong mechanical joining with a minimum of blind side damage has become an area of focus within the art. U.S. Pat. No. 4,203,346 to Hall, et al, and U.S. Pat. No. 4,033,222 to Wilson (also assigned to the common assignee of this application) both address blind fasteners directed toward this problem area. FIGS. 1 and 2 herein are directed towards the subject matter of the Hall, et al. patent while FIGS. 3 and 4 are directed to the most relative teaching from the Wilson patent.

Turning first to FIGS. 1 and 2, it can be seen that the blind fastener, generally indicated as 10, of the Hall teaching comprises three portions. A nut, generally indicated as 12, a sleeve, generally indicated as 14, and a corebolt, generally indicated as 16. The nut comprises a head 18, a first cylindrical portion 20 adjacent the head 18, a second cylindrical portion 22 adjacent first portion 20 and a beveled nose portion 24 on the end opposite head 18. Sleeve 14 comprises a first portion 26 having a constant thickness wall about an internal bore 28 of slightly larger diameter than the threaded portion of corebolt 16 and a second portion 30 having an interal bore 32 tapering outward such that the walls become increasingly thinner. Corebolt 16 has a threaded portion 34 and a head 36. With sleeve 14 slid onto corebolt 16 and bolt 16 threaded into nut 12, the fastener 10 is passed through a plurality of panels, generally indicated as 38, as shown in FIG. 2. As the nut 12 and corebolt 16 are threaded together, the sleeve 14 is firmly abutted against head 36 on one end and against a specially provided shoulder 40 where first cyclindrical portion 20 and second cyclindrical portion 22 of nut 12 meet on the other end. As nut 12 and corebolt 16 are thereafter further threadedly engaged, sleeve 14 is put under a compressive force causing second portion 30 thereof to buckle radially outward in the manner shown in FIG. 2. This action, provided by the shoulder 40 on the nut 12 eliminates the so-called "cookie-cutter" effect which occurs when a sleeve is forced against the composite material of the innermost panel 38 for its compressive force.

Turning next to the prior art fastener of FIGS. 3 and 4, once again, the fastener generally indicated as 42, has a nut portion, generally indicated as 44, and a corebolt portion, generally indicated as 46. The nut 44 has a head 48, a body portion 50 and a nose portion 52. The body portion 50 is of a diameter so as to be a clearance fit when passed through a common bore 54 located in a plurality of panels 56. The bolt 46 has a head 58 and a threaded portion 60. A pair of sleeves 62 are disposed on the threaded portion 60. The first sleeve, generally indicated as 64, is disposed adjacent nut 44 and comprises a cyclindrical body portion 66 and a tapered nose portion 68. Tapered nose portion 68 faces in the same direction as the nose portion 52 of nut 44. The second sleeve 70 also has a cylindrical body portion 72. First sleeve 64 is made of a more ductile material than second sleeve 70 whereby as nut 44 is disposed within bore 54 and threadily engaged with corebolt 46 to compress sleeves 64, 70 between the heads 48,58, first sleeve 64 will more readily deform and, therefore, will be deformed along the blind side of panels 56 to form a protective surface 76 against which second sleeve 70 is deformed as nut 44 and bolt 46 are continued in their threaded engagement whereby the assembled state as shown in FIG. 4 is finally created.

The prior art fastener of FIGS. 1 and 2 requires that the nut 12 and sleeve 14 thereof be specially constructed. The fastner of FIGS. 3 and 4 produces some unprotected bearing of the first sleeve 64 against the blind side of the panels 56 adjacent bore 54.

Wherefore, it is the object of the present invention to provide a blind fastener for use with composite material panels which is simple in nature, inexpensive to manufacture, provides no direct bearing against the blind side, and is of a design such as to allow the use of existing tooling in the inventory of users to a maximum.

SUMMARY

The foregoing objectives of the present invention have been met in a blind fastener having a nut with an internally threaded axial bore throughout with a generally conically shaped nose portion at one end and a head of larger diameter than the nose portion at the other end, and an intermediate generally cyclindrical portion of lesser diameter than the head between the nose portion and the head, a corebolt having a head and a threaded shank portion, the main shank portion being at least as long as the nut, the threaded shank portion being threaded in the axial bore of the nut, by the improvement which comprises a first expansible cyclindrical liner sleeve having an internal diameter which is sized to create a sliding fit on the intermediate portion of the nut, the first sleeve being disposed on the intermediate portion in abuttment with a portion of the nut adjacent the head thereof. A second expansible cyclindrical sleeve is also provided having an internal diameter which is sized to create a sliding fit on the shank portion of the corebolt. The second sleeve is disposed on the shank portion between the head of the core bolt and the first sleeve. The second sleeve is adapted through heat treating and geometry to perform in the manner of a less ductile material than the first sleeve and the first and second sleeves meet in non-sliding abutted surfaces whereby as the nut and corebolt are threaded together, compresive forces are transmitted through the second sleeve into the first sleeve to deform the first sleeve radially outward and back along the intermediate portion of the nut towards the head of the nut and the second sleeve is expanded primarily by the nose portion of the nut.

In one embodiment of the present invention, the first sleeve is of a length to extend out over the nose portion of the nut a distance such as to be partially deformed by the second sleeve before the second sleeve is deformed substantially radially outward by the nose portion of the nut whereby the first sleeve is caused to deform by crumpling along the intermediate portion of the nut.

In another embodiment, the first sleeve is of a length such that the second sleeve is deformed radially outward by the nose portion of the nut before abutting the first sleeve an amount to cause the second sleeve to both compress the first sleeve and force it radially outward whereby the first sleeve is caused to deform by flaring out and away from the intermediate portion of the nut.

DESCRIPTION OF THE DRAWINGS

FIG. 4 is an assembled view of the fastener of FIG. 3.

FIG. 5 is an exploded view of the fastener of the present invention.

FIG. 6 is a cutaway assembled view of the fastener of the present invention in one embodiment thereof.

FIG. 7 is a cutaway view of the fastener of the present invention in another embodiment thereof.

FIGS. 12-18 show sizing of a tested embodiment.

DESCRIPTION OF THE PREFERRED EMBODIMENT

Figure 3:
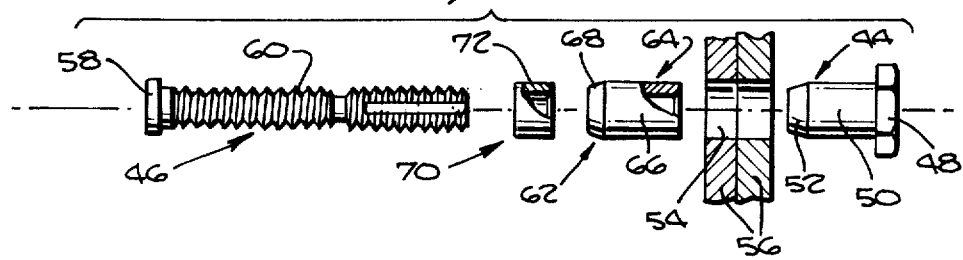
FIG. 3 is an exploded view of another prior art blind fastener.

The preferred embodiment of the present invention is shown exploded in FIG. 5 and assembled in FIG. 6. The fastener, generally indicated as 78, comprises a nut, generally indicated as 80, a corebolt, generally indicated as 82, and a pair of sleeves, generally indicated as 84. Again, the fastener 78 is described with respect to a common bore 86 in a pair of panels 88 being joined by fastener 78. As with the fastener of FIGS. 3 and 4, nut 80 comprises a head 90, a cyclindrical body portion 92 having an axially threaded bore 94 therethrough, and a tapering conical nose portion 96. Whereas the body portion of the nut 44 in the prior art embodiments of FIGS. 3 and 4 was sized to be a clearance diameter with respect to common bore 86 through panels 88, in the present invention, cyclindrical body portion 92, is slightly smaller in diameter than bores 86. First sleeve 98 functions as a liner for bores 86 and is of a highly ductile material. It has thin side walls, has an outside diameter which is a clearance fit to the bores 86 and an internal diameter which is a clearance fit to the cyclindrical body portion 92 of nut 80. Additionally, first sleeve 98, when abutted against head 90 as shown in FIG. 6, extends past the inside surface 100 (the blind side) of panels 88 adjacent the nose portion 96 of nut 80 to be deformed in a manner to be more completely described hereinafter.

Corebolt 82 has a head 104 which is a clearance fit for bores 86 and a threaded body portion 106 adapted to threadably mate with threaded bore 94 of nut 80. A score line 108 is provided in threaded body portion 106 so that the outer projecting portion can be snapped off and removed in the usual manner once fastener 78 is assembled so as to provide a substantially smooth outer surface adjacent head 90 of nut 80.

Second sleeve 102 is of an expandable material but is also adapted through heat treating or physical geometry to perform in the manner of a material less ductile than first sleeve 98. It's outside diameter is a clearance fit to bores 86 and it's internal diameter is a clearance fit for threaded body portion 106 of corebolt 82. The nut 80, corebolt 82, and sleeves 84 are assembled in the manner shown in FIG. 5 wherein first sleeve 98 is adjacent head 90 of nut 80 and second sleeve 102 is adjacent head 104 of corebolt 82. In it's loosely assembled condition, fastener 78 is passed through the bores 86 of panels 88 with head 90 against the outer surface 110 of panels 88. As nut 80 and corebolt 82 are threadily engaged to cause the heads 90,104 to move closer together, sleeves 84 are first brought into abuttment and thereafter subjected to a compressive force between heads 90,104. In the prior art embodiment of FIGS. 3 and 4 wherein multiple sleeves are employed, it will be noted that the sleeves 64,70 abut one another in sliding surfaces such that sleeve 70 is made to flair outward and over sleeve 64. By contrast, in the present invention, first and second sleeves 98,102 in their abutting surfaces, indicated as 112 and 114 respectively, meet in non-slip surfaces. That is, surfaces 112,114 are normal to the longitudinal axis of the fastener 78. This, combined with the difference in ductility of the materials and the difference in wall thickness of first sleeve 98 and second sleeve 102 cause a control deformation of first sleeve 98 which accomplishes the objectives of the present invention.

Figure 8:
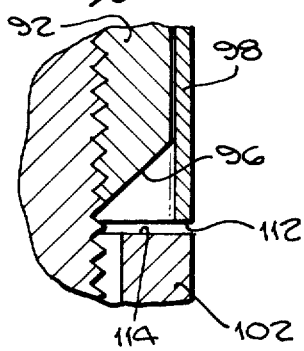
FIGS. 8 and 9 are enlarged drawings of the abutting areas of the two sleeves of the present invention sized to create deformation as shown in FIG. 7.
Figure 9:
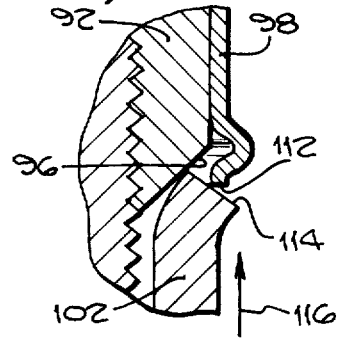

Deformation of second sleeve 102 can be accomplished in one of two ways, depending upon the positioning of the inner end of first sleeve 98 with respect to the tapered conical nose portion 96 of nut 80. This can best be understood with reference to FIGS. 8 through 11. Referring first to FIGS. 8 and 9, if first sleeve 98 extends out over nose portion 96 sufficiently to be contacted by second sleeve 102 before any substantial deformation of second sleeve 102 is accomplished by nose portion 96, a longitudinal buckling force, as indicated by the arrow 116 will be imparted into first sleeve 98. This will cause first sleeve 98 to buckle as shown and to crumple about cyclindrical body portion 92 of nut 80 in the manner shown in FIG. 7.

Figure 11:
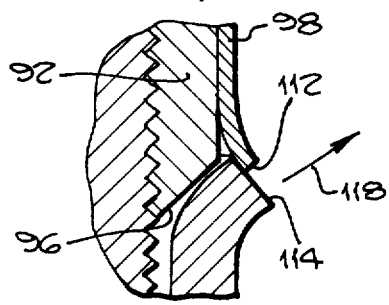
FIGS. 10 and 11 correspond to FIGS. 8 and 9 but show sizing of the sleeves to cause deformation as shown in FIG. 6.
Figure 10:
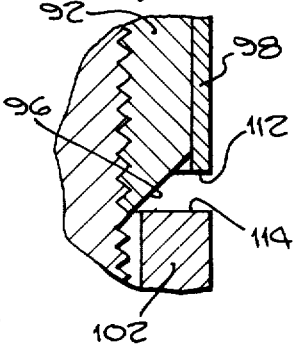

Turning now to FIGS. 10 and 11, if, by contrast, the length of first sleeve 98 is reduced as shown such that second sleeve 102 first contacts nose portion 96 and is deformed partially outward prior to its contacting first sleeve 98, a combined compressive and radially outward force will be imparted into first sleeve 98 as symbolized by the arrow 118 such that first sleeve 98 will be flared outward and backward towards inside surface 100 to finally assume the position of FIG. 6 when the fastener 78 has been completely tightened as shown in FIG. 6.

Figure 1:
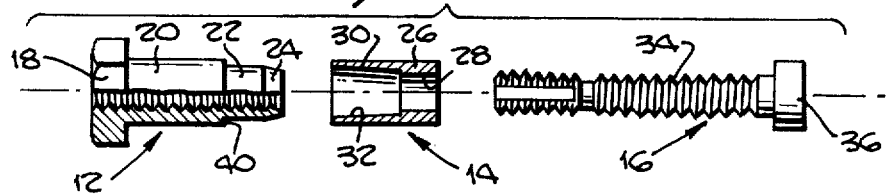
FIG. 1 is an exploded view of a blind fastener according to the prior art.
Figure 2:
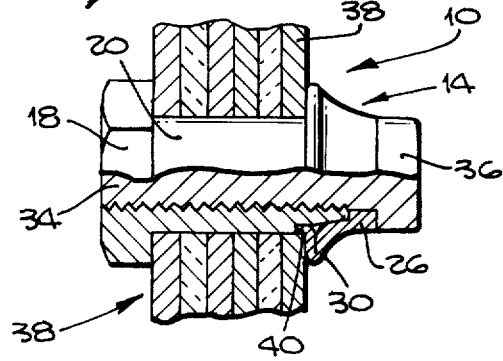
FIG. 2 is an assembled view of the fastener of FIG. 1.

Turning once again with particularity to FIG. 7, in addition to showing one of the two modes of deformation of first sleeve 98, it also discloses an alternate method of construction wherein the cyclindrical body portion 92 of nut 80 is divided into an inner portion 120 and an outer portion 122 in the manner of the nut 12 of the prior art embodiment of FIGS. 1 and 2. Inter portion 120 is of a smaller diameter to allow first sleeve 98 to be disposed thereabout where outer portion 122 is of a diameter such as to be a clearance fit for bores 86. This approach can be used to modify existing inventories of some prior art fasteners, but is not preferred in that it does not provide the complete inner protection for bores 86 as accomplished by the preferred embodiment of the present invention as described hereinbefore.

The dimension of a tested embodiment of the present invention in its preferred embodiment are shown in FIGS. 12-18. The particulars of material sizing and selection are as follows:

The liner sleeve 98 should be constructed of a material compatible with the composite structure and should be ductile enough not to fracture during the deformation process. Any one of a number of stainless steels fit this description such as 201 or 202 stainless steel. The tensile strenght of the material should be between 35 Ksi and 65 Ksi with 50 Ksi ultimate tensile strength being preferred. The wall thickness should be between 2% and 6% of the liner outside diameter with 4% being preferred.

The sleeve 102 should be constructed of a material compatible with the composite structure and the other fastner components. 300 series stainless steel of A-286 Cres are preferred. The ultimate tensile strength should be between 80 Ksi and 150 Ksi ultimate tensile strength being preferred. The wall thickness should be between 12% and 16% of the outside diameter with 14% being preferred.

The corebolt 82 should be fabricated from a high strength material compatible with the other fastener components and composite structure. Ti6A4V titanium is preferred, however, A-286 or Iconel 71B will work equally well. The corebolt should have an ultimate tensile strength in excess of 160 Ksi with 180 Ksi being preferred. The major diameter of the corebolt should be approximately 60% of the basic fastner outside diameter.

The nut should be fabricated from a high strength light weight material such as titanium, solution treated and aged.

Thus, from the foregoing description, it can be see that the fastener of the present invention provides a blind fastener for use with composite panels meeting the objectives stated therefor.

Wherefore, having thus described my invention, I claim:

1. In a blind fastener having a nut with an internally threaded axial bore throughout with a generally conically shaped nose portion at one end and a head of larger diameter than said nose portion at the other end, and an intermediate generally cylindrical portion of lesser diameter than said head between the nose portion and the head, a corebolt having a head and a threaded shank portion, the threaded shank portion being threaded in the axial bore of the nut, the improvement which comprises:
(a) a first expansible cylindrical sleeve having an internal diameter which is sized to create a sliding fit on the intermediate portion of the nut, said first sleeve being disposed on said intermediate portion in abuttment with a portion of the nut adjacent the head thereof; and,
(b) a second expansible cylindrical sleeve having an internal diameter which is sized to create a sliding fit on the shank portion of the corebolt, said second sleeve being disposed on said shank portion between the head of the core bolt and said first sleeve, said second sleeve being adapted to perform in the manner of a less ductile material than said first sleeve, said first and second sleeves meeting in non-sliding abutting surfaces whereby as the nut and corebolt are threaded together compressive forces are transmitted through said second sleeve into said first sleeve to deform said first sleeve radially outward and back along the intermediate portion of the nut towards the head of the nut and said second sleeve is expanded primarily by the nose portion of the nut.

2. The blind fastener of claim 1, wherein:
said first sleeve is of a length to extend out over the nose portion of the nut a distance such as to be partially deformed by said second sleeve before said second sleeve is deformed substantially radially outward by the nose portion of the nut whereby said first sleeve is caused to deform by crumpling along the intermediate portion of the nut.

3. The blind fastener of claim 1 wherein:
said first sleeve is of a length such that such second sleeve is deformed radially outward by the nose portion of the nut before abutting said first sleeve an amount to cause said second sleeve to both compress said first sleeve and force it radially outward whereby said first sleeve is caused to deform by flaring out and away from the intermediate portion of the nut.

4. The blind fastener of claim 1 wherein:
said second sleeve is heat treated to make it perform in a manner less ductile than said first sleeve.

5. The blind fastener of claim 1 wherein:
said second sleeve has its sidewalls sized in thickness with respect to the thickness of the sidewalls of said first sleeve an amount to impart the quality of being less ductile.

6. The blind fastener of claim 5 wherein:
(a) the wall thickness of said first sleeve is between 2% and 6% of the outside diameter of said first sleeve; and,
(b) the wall thickness of said second sleeve is between 12% and 16% of the outside diameter of said second sleeve.

7. The blind fastener of claim 6 wherein:
(a) the wall thickness of said first sleeve is 4% of its outside diameter; and
(b) the wall thickness of said second sleeve is 14% of its outside diameter.

8. The blind fastener of claim 1 wherein:
the major diameter of the corebolt is about 60% of the outside diameter of said first sleeve.

9. The blind fastener of claim 1 wherein:
(a) the tensile strength of the material of said first sleeve is between 35 Ksi and 65 Ksi; and,
(b) the tensile strength of the material of said second sleeve is between 80 Ksi and 150 Ksi.

10. The blind fastener of claim 9 wherein:
(a) the tensile strength of the material of said first sleeve is 50 Ksi; and,
(b) the tensile strength of the material of said second sleeve is 115 Ksi.

* * * * *